Oct. 22, 1968  F. P. CLIFFORD  3,406,601
AUTOMATIC MEASURING APPARATUS

Filed Sept. 19, 1967  3 Sheets-Sheet 1

INVENTOR
Francis Patrick Clifford his attorneys

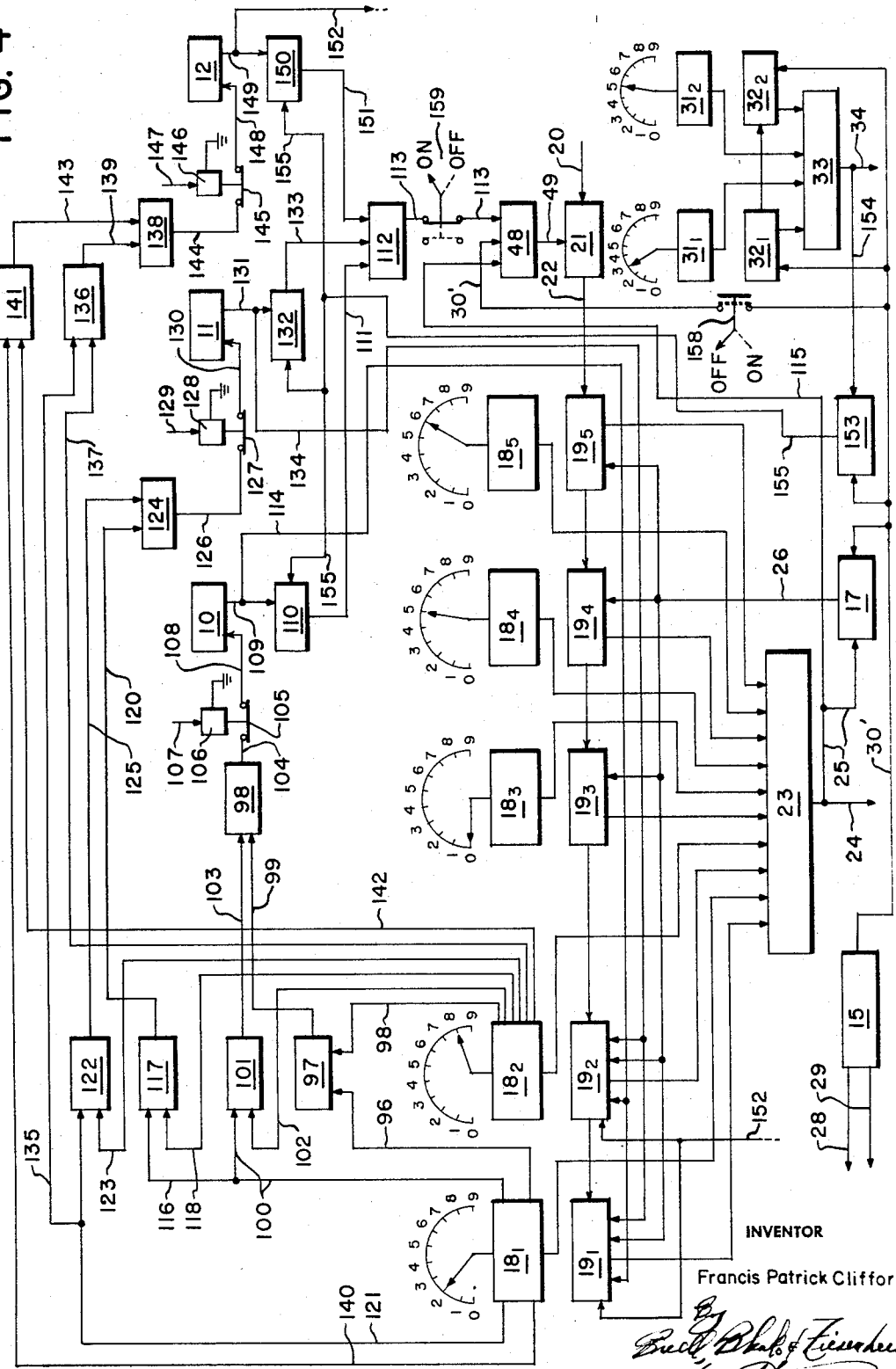

United States Patent Office 3,406,601  
Patented Oct. 22, 1968

3,406,601  
AUTOMATIC MEASURING APPARATUS  
Francis Patrick Clifford, 124 2nd St.,  
Pittsburgh, Pa. 15215  
Filed Sept. 19, 1967, Ser. No. 668,835  
10 Claims. (Cl. 83—72)

ABSTRACT OF THE DISCLOSURE

An apparatus for automatically and accurately measuring varying lengths of moving material. It is particularly useful where different lengths are to be measured in rapid succession. It combines features of a pulse means in contact with the moving material which generates electrical pulses at intervals corresponding substantially to a set distance of material travel and of sensing devices placed at given positions from a reference point. The electrical pulses from the pulse means are tallied by a counting means whose tally is adjusted either periodically or complementarily by correcting means which receives electrical signals from the sensing devices. In operation, the apparatus may actuate die mechanisms to cut or stamp the material at desired lengths.

---

This invention relates to an automatic measuring apparatus used to measure lengths of moving material. It is particularly useful in providing accurate measurement of material where different lengths are to be measured in rapid succession.

The use of apparatus to automatically measure moving material into different predetermined lengths is broadly old and well known. It provides manufacturers and fabricators with a means of linearly measuring material which is moving hundreds of feet per minute so that die mechanisms can be positioned relative to the material to cut, stamp and the like. One such measuring apparatus, heretofore, consisted of placing a photoelectric cell or limit switch at a predetermined distance from a reference point. When an edge of the moving material interrupted the beam of the photoelectric cell or tripped the limit switch, a die mechanism was actuated to cut or stamp the material. Such apparatus was very accurate and was used for many years. Such apparatus, however, was unusable where different lengths of material were to be measured in rapid succession; each variation in the length of material to be measured required stopping the production line and manually changing the position of the photoelectric cell or limit switch relative to the die mechanism.

Another measuring apparatus used heretofore consisted of pulse means in contact with the moving material. The pulse means would produce electrical pulses at intervals corresponding substantially to a set distance of material travel. The pulse means was connected with a counting means which tallied the electrical pulses until a programmed total was reached. Upon reaching the programmed total, the counting means actuated a die mechanism which would cut or stamp the material. Such apparatus has been commercially used for many years, but with only limited satisfaction. The accuracy of the apparatus fell short of the accuracy in certain commercial operations, particularly where long lengths were to be measured. In an attempt to improve the accuracy many variants were proposed, particularly to the die mechanism. The error in such measurements, however, was still commonly greater than 1/32 inch on lengths greater than 10 feet.

The present invention overcomes these difficulties and makes greater accuracy in measuring moving material commercially feasible.

I provide an apparatus for automatically measuring moving material into different desired lengths with any desired accuracy, within practical limits, which may be needed in commercial operations. The apparatus comprises pulse means having movable means of known dimensions in contact with the moving material and having a transducer, frequency generator and Schmitt trigger, or the like connected to the movable means so that it will generate electrical pulses at intervals corresponding substantially to a set distance of material travel. The pulse means is connected to a counting means which can tally the electrical pulses. The tallying of electrical pulses is commenced by a triggering point of the material moving past a sensing device at a reference point, e.g., by an edge of the material moving through the beam of a photoelectric cell, or by shearing of the material with a die mechanism. The tally is stopped when it reaches a total which was previously programmed into the counting means. Sensing devices, such as photoelectric cells or magnetic devices, are placed at predetermined distances along the path of moving material from the reference point; each sensing device can give an electrical signal to correcting means when a triggering point of the material moves past it at the predetermined distance, e.g., an edge of the material moving through the beam of a photoelectric cell or an edge of the material moving through a magnetic field. In turn, correcting means, when actuated, adjusts the tally of the counting means to correspond to an essentially perfect measurement of the distance between the reference point and the position of the sensing device actuating said correcting means.

The accuracy of measurement desired is determined by the number and positioning of the sensing devices. The greater the accuracy desired the shorter the intervals at which the sensing devices must be placed and the more sensing devices must be used; in this way, the pulse means is relied upon to measure over shorter distances. On the other hand, the sensing devices must be positioned within close tolerances so that they can actuate correcting means at the distance corresponding to the tally to which said correcting means adjusts the counting means. I also prefer for simplicity that the sensing devices be positioned at intervals of equal distance.

I prefer that the correcting means control the sensing devices so that each sensing device is permissive to triggering only at the approximate time the material will be passing it, but beyond the possible error in measuring with the pulse means. In this way, errors in measurement are minimized and lengths of any size can be measured in rapid succession without prearranged sequence. Further, I prefer the apparatus have a second counting means to automatically monitor the adjustments made by the correcting means. The second counting means is connected to the pulse means and is started by the correcting means when the tally reaches a given total; it is stopped when a sensing device actuates the correcting means to adjust the tally. By this arrangement, the error in measurement by the pulse means is directly read from the second counting means or calculated from it, and the pulse means is adjusted manually (such as by increasing or decreasing the pressure on the pulse means) so that the smallest limits of error can be maintained.

In an alternative embodiment, the counting means is started by one of the sensing devices. When the counting means is programmed and the measuring commenced, the sensing device furtherest from the reference point and still within the desired length is made permissive by correcting means, and the counting means is provided with a tally corresponding to the distance between the permissive sensing device and the reference point by correcting means. The tallying of electrical pulses from the pulse means is commenced when the triggering point of the material, such as an edge of it, passes said permissive sensing device positioned at the said distance. The tallying is stopped when the programmed tally is reached.

In application, the measuring apparatus can be used in conjunction with an automatic shearing means to cut the material into desired lengths; or it can be used to automatically position a die mechanism or mechanisms for stamping, cutting and the like along the material. It can also be used to perform a combination of these operations. The die mechanism can be a stationary type or a flying type; if it is a flying type it is preferred that the actuation thereof not effect the rate of count of the pulse means, i.e., it should not be a flying die mechanism of the differential type. When a differential type is used, provision must be made to correct the tally of the counting means only when the die is "home." In any event, I contemplate the use of a die mechanism which reacts almost instantaneously—a few microseconds—after the tally in the counting means reaches the desired total; or the use of a die mechanism which compensates for the time delay of reaction. If there is a time delay of reaction and the die mechanism does not compensate for it, the time delay can be compensated for by repositioning the die mechanism in relation to the reference point based upon an average line speed. I do not, however, prefer this means of compensation it introduces error because measurement over the increment of time of reaction is made on the basis of time and not distance and, hence, variations in line speed are not compensated for save by manual repositioning of the die mechanism. Further, when the measuring apparatus is used to actuate a shearing means only, I prefer that the shearing means be positioned at the reference point so that reference cuts can be made and an independent triggering device will not be necessary to commence the measurement by the measuring apparatus.

Other details, objects and advantages of my invention will become apparent as the following description of the presently preferred embodiments thereof proceeds.

In the accompanying drawings, I illustrate presently preferred embodiments of my invention in which:

FIGURE 4 is a block diagram of an alternative electrical circuit corresponding to FIGURE 1.

Figure 1:
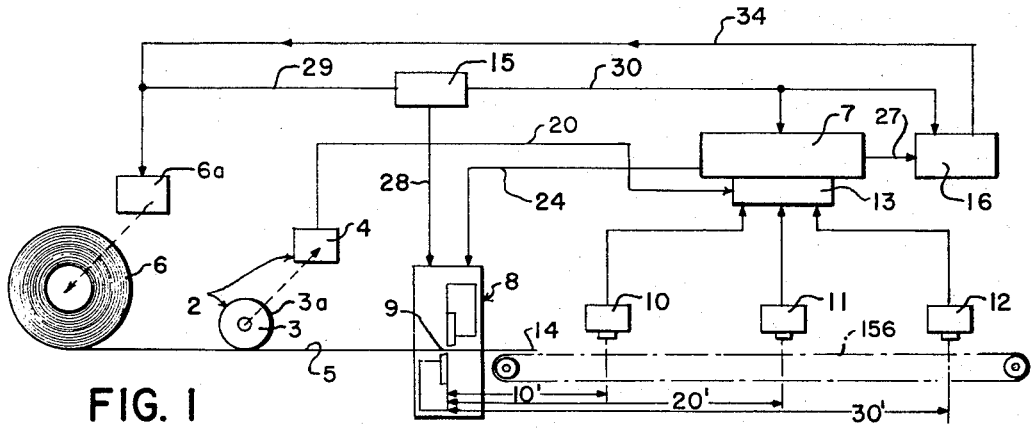
FIGURE 1 is a schematic view showing an apparatus for automatically and accurately measuring moving material into desired lengths so that steel sheet can be cut-to-length.

Referring specifically to the drawings, an automatic measuring apparatus is comprised of pulse means 2 having a wheel 3 with a given circumference 3a in contact with moving steel sheet 5 and having transducer 4 connected either directly or through a gear train. Moving steel sheet 5 is coming from roll 6 which is driven by power means 6a. Pulse means 2 will produce electrical pulses at intervals corresponding to the rotation of the wheel 3 and in turn the distance along given circumference 3a. For example, transducer 4 can produce electrical pulses at a rate of one for each movement of the wheel 3 by 0.01 inch measured along given circumference 3a. The pulse means 2 is connected to a counting means 7 which can tally the electrical pulses from the transducer 4 of pulse means 2. Shearing means 8 is positioned so that, when actuated, either manually or automatically, it will cut the steel sheet 5 at a given point 9, herein called reference point 9. As shown, shearing means 9 is a stationary shear which has almost instantaneous reaction time, or which compensates for the time delay of reaction by having clamping means which grip the moving material at the shearing means stopping it for a few microseconds while the die is operating and allowing the material to hump in the area between the pulse means 2 and the shearing means 8 by suitable means; the shearing means 8 may alternatively be a flying shear whose actuation does not affect the rate of count by the pulse means 2 which has almost instantaneous reaction time or compensates for it. Sensing devices 10, 11 and 12 are photoelectric cells, each cell having a beam separately powered and having switching means so that it will give an output signal only after it receives a permissive signal and its beam is broken. I prefer that each sensing device be comprised of a light source such as Model E8BCLITE manufactured by Autotron Inc. (1–67), which is masked to provide a focal point of small area and relative little conveyence and divergence of the light emitted from the light source, a light senser such as Model E8BP5AC manufactured by Autotron Inc. (1–67), and a light amplifier such as Model 801BBA manufactured by Autotron Inc. (1–67). Sensing devices 10, 11 and 12 are set a predetermined and equally spaced distances from the reference point 9, and connected to correction means 13; for purposes of description, I will assume that the sensing devices 10, 11 and 12 are placed 10 feet, 20 feet and 30 feet respectively from the reference point 9. So arranged the passage of an edge 14 of the steel sheet 5 through a beam of one of the sensing devices 10, 11 or 12 will actuate the correcting means 13. The correcting means 13 will in turn adjust the tally of the counting means 7 to an essentially perfect measurement of the distance between the reference point 9 and the sensing devices 10, 11 or 12, whichever actuated the correcting means 13.

The operation of the apparatus is initiated by manually operating restart switch 15 which actuates shearing means 8 through lead 28; shearing means 8, in turn, makes a reference cut at reference point 9. Restart switch 15, when operated, also starts the movement of the steel sheet 5 by actuating power means 6a through lead 29, sets counting means 7 and sheets counter 16 to zero by actuating reset circuit 17 (see FIG. 2) of counting means 7 and binary decimal counter units $32_1$ and $32_2$ of sheets counter 16 through lead 30, and starts the count of electrical pulses from the pulse means 2 by actuating switching circuit 48 (see FIG. 2) through lead 30. By initiating the operation in this way, a switching means and sensing devices are not needed to start the tallying by the counting means 7 of the electrical pulses produced by pulse means 2 when an edge 14 of the steel sheet 5 moves past reference point 9.

To eliminate premature and artifact correction of the tally of the counting means 7, I prefer that the correcting means 13 accept electrical signals from sensing device 10, 11 and 12 only for a short period of time approximating when the triggering point on the material will be passing each of them and then only in sequence; however, correcting means 13 must accept electrical signals for a period of time corresponding to a distance greater than the largest possible error of pulse means 2 in measuring the longest distance between sensing devices. For purposes of further description, I will assume that the error of pulse means in measuring 10 feet is no greater than 0.49 inch. And I assume, also, that electrical pulses are produced by the transducer 4 of pulse means 2 at a rate of one for each movement by the wheel 3 by 0.01 inch measured along given circumference 3a.

The counting means is a five decade digital counter which can tally up to 999.99 inches in units of hundredths (0.01) of inches. It may be a commercial unit such as Model DDP-5 manufactured by WER Industrial Corporation (12-66) or Model P-5 manufactured by Post Electronic Products (1-67), or it may be fabricated from components as hereinbelow described. The particular length to be measured is programmed into storage units $18_1$, $18_2$, $18_3$, $18_4$ and $18_5$ manually (as shown) or by an additional computer type programming attachment (not shown). Each storage unit $18_n$ can be a commercially available component such as the "Decade A (Type DEA)" module manufactured by Westinghouse Electric Corporation (See P.C. Diag. 557-C-255, 4/1/62). The counting means 7 also has binary decimal counter units $19_1$, $19_2$, $19_3$, $19_4$ and $19_5$, having internal resets, connected in series so that their tallies cascade from one to the next and in turn tally the electrical pulses produced by transducer 4 of pulse means 2. Each binary decimal counter unit $19_n$ can be a commercially available component such as the "Binary Counter" module (Part No. 58-0353) manufactured by Cutler-Hammer, Inc. (1/2/67). The electrical pulses are fed to the counting means 7 at decimal counter unit $19_5$, tallying the hundredths units, through lead 26, "and" circuit 21, and lead 22. Each storage unit $18_1$, $18_2$, $18_3$, $18_4$ and $18_5$ and each decimal counter unit $19_1$, $19_2$, $19_3$, $19_4$ and $19_5$, is connected to coincidence circuit 23 by suitable leads. The coincidence circuit 23 can be a standard circuit composed of five coincidence modules such as "Coincidence Module (Type KC)" manufactured by Westinghouse Electric Corp. (see P.C. Diag. 557-C-267, 4/1/62) and a plurality of "and" circuits connected in series. When the tally of decimal counter units $19_1$, $19_2$, $19_3$, $19_4$ and $19_5$ conicides with the programmed total of storage units $18_1$, $18_2$, $18_3$, $18_4$ and $18_5$, an actuating signal is given through lead 24 to shearing means 8, which in turn cuts the steel sheet 5 at reference point 9, and through lead 25 to reset circuit 17, which in turn resets to zero the decimal counter units $19_1$, $19_2$, $19_3$, $19_4$ and $19_5$ through lead 26 and the internal reset means of counter units $19_1$, $19_2$, $19_3$, $19_4$ and $19_5$. Reset circuit 17 can be a commercially available component such as "or" module (Part No. 28-919) manufactured by Cutler-Hammer, Inc. (1/2/67). Further, when the tally of decimal counter units $19_1$, $19_2$, $19_3$, $19_4$ and $19_5$ coincides with the programmed total of storage units $18_1$, $18_2$, $18_3$, $18_4$ and $18_5$ an electrical signal is given to sheets counter 16 through lead 27; the sheets counter in turn tallies the number of sheets cut of the desired length.

I prefer the sheets counter 16 be an integral part of the counting means 7, but to facilitate description I have here set it out as a separate component. The sheets counter can be an independent commercial unit such as Model DDP-2 or DDP-3 manufactured by WER Industrial Corporation (1/2/66) or Model P-3 manufactured by Post Electronic Products (1-67), or it may be fabricated from components as herein below described. It can be made to tally as many sheets as desired by simply incorporating additional storage units and binary counter units; as here described it can tally as many as 99 sheets. The number of sheets of the desired length is programmed into storage units $31_1$ and $31_2$ manually (as shown) or by an additional computer type programming attachment (not shown). Each storage unit $31_n$ can be a commercially available component as the "Decade A (Type DEA)" module manufactured by Westinghouse Electric Corp. (See P.C. Diag. 557-C-255; 4/1/62). The sheets counter 16 also has binary decimal counter units $32_1$ and $32_2$, having internal reset circuits, connected in series so that their tallies cascade from one to the next. Each binary decimal counter unit $32_n$ can be a commercially available component such as the "Binary Counter" module (Part No. 58-3503) manufactured by Cutler-Hammer, Inc. (1/2/67). Electrical signals are fed to the sheets counter 16 at decimal counter unit $32_1$, counting the ones units, through lead 27. Each storage unit $31_1$ and $31_2$ and each decimal counter unit $32_1$ and $32_2$ is connected to coincidence circuit 33 by suitable leads. The coincidence circuit 33 can be a standard circuit composed of two coincidence modules such as "Coincidence Module (Type KC)" manufactured by Westinghouse Electric Corp. (See P.C. Diag. 557-C-267, 4/1/62) and an "and" circuit connected in series. When the tally of the binary counter units $32_1$ and $32_2$ coincides with the programmed total of storage units $31_1$ and $31_2$, coincidence circuit 33 gives an electrical signal to stop the movement of the steel sheet 5 through lead 34.

If, as is contemplated (but not shown in the drawings to simplify the description), a plurality of banks of storage units are provided in the counting means 7 and in the sheets counter 16 (each having a corresponding bank), the output signal of the sheets counter 16 through lead 34 will switch the apparatus to the next desired length and number of sheets thereof, if any, stored in the next bank of storage units. In this way, the operation of the apparatus can be continuous, as may be necessary in certain applications. Said plural bank counting means 7 may be a commercially available counter such as Model DDPS-5 manufactured by WER Industrial Corporation (12-66), and said plural bank sheet counter may be a commercially available counter such as Model BD-2 or BD-3 manufactured by WER Industrial Corporation (12-66). The output signal will also (not shown in the drawings) be received by reset circuit 17 and directly by binary counter units $32_1$ and $32_2$ so that the counting means 7 and sheets counter 16 will be reset to zero. It thus would be only when there was no programmed length in the next bank of storage units that the signal would be given to power means 6a to stop the movement of steel sheet 5. In the alternative, if a computer-type programming attachment is provided, the output signal of sheets counter 16 will actuate the attachment so that the next length to be measured and the number of sheets thereof is programmed into the counting means 7 and sheets counter 16.

The correcting means 13 is composed of essentially separate circuits to perform the adjustment of the tally to the correct measurement when an edge 14 of the steel sheet 5 passes each of the sensing devices 10, 11 and 12. The circuits are to a degree interconnected to provide convenience and economy in wiring, and to provide for sequential correction of the tally. To make corrections when an electrical signal is received from sensing device 10 (positioned 10 feet from reference point 9), lead 35 is connected to storage unit $18_1$ so that an electrical signal is provided to "and" circuit 36 [1] when digit "1" (and any or all other digits except "0") thereof is selected in programming. Lead 37 is connected to storage unit $18_2$ so that an electrical signal is provided to "and" circuit 36 when one of the digits "2" through "9" thereof is selected in programming. By this arrangement, "and" circuit 36 will provide an electrical signal to "or" circuit 38 [2] through lead 39 when a length of 120.00 inches (10 feet) or greater, but less than 200.00 inches is programmed for measurement. Lead 40 is connected to storage unit $18_1$ so that an electrical signal is provided to "or" circuit 38 when one of the digits "2" through "9" thereof is selected in programming. Thus, an electrical signal is provided to "or" circuit 38 through lead 40 when a length greater than 200.00 inches is programmed for measurement. "Or" circuit 38 will, in turn, provide an electrical signal to "and" circuit 41 through lead 42 when a length greater than 120.00 inches (10 feet) is programmed for measurement. Lead 43 is connected to coincidence circuit 23 so that an electrical signal is provided to "and" circuit 41 when a tally of 119.50 is registered by decimal counter units $19_1$, $19_2$, $19_3$, $19_4$ and $19_5$. "And" circuit 41 will hence provide an electrical signal to sensing device 10 through lead 44 only when a length of 120.00 inches or greater is programmed for measurement and after the tally from the pulse means 2 is within 0.50 inch of counting 120.00 At the same time, "and" circuit 41 provides an electrical signal to switching circuit 48 through lead 45, "or" circuit 46 and lead 47; switching circuit 48 [3] in turn

---

[1] An "and" circuit is a circuit which will produce an output signal when signals are received through all inputs. Such circuits are standard components, such as Part No. 58-3556 manufactured by Cutler-Hammer, Inc. (1/2/67).

[2] An "or" circuit is a circuit which will produce an output signal when a signal is received through any one of the inputs. Such circuits are standard components, such as Part No. 28-919 manufactured by Cutler-Hammer, Inc. (1/2/67).

Figure 3:
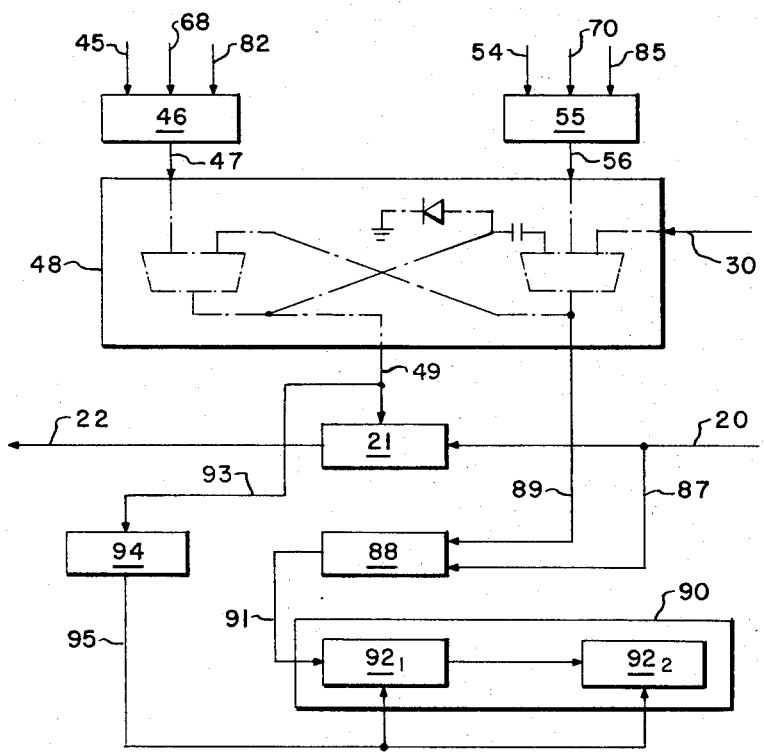
FIGURE 3 is a block diagram of a second counting means which can be attached to FIGURE 2 so that the error of measurement by the pulse means is automatically monitored.

[3] Switching circuit 48 is a standard memory (or "flip-flop") circuit with an internal time delay for one of the inputs of a few microseconds. Such a circuit is provided on "Utility Module Modified (Type VTMI)" manufactured by Westinghouse Electric Corp. (See P.C. Diag. 557-C-189, 4/1/6.)

stops providing an electrical signal to "and" circuit 21 through lead 49 thereby stopping the feed of electrical pulses from pulse means 2 to the counting means 7. Also, at the same time, "and" circuit 41 provides an electrical signal to reset circuit 17 through lead 50, stretching circuit 51[4] and lead 52, so that the tally is cleared from the decimal counter units $19_1$, $19_2$, $19_3$, $19_4$ and $19_5$ after the feed of electrical pulses from the pulse means 2 are stopped, and prior to actuation of the sensing device 10 by an edge 14 of the moving steel sheet 5. Lead 53 is connected to decimal counter units $19_1$ and $19_2$ such that, when sensing device 10 is actuated, digits "1" and "2" are registered by decimal counter units $19_1$ and $19_2$ respectively. Hence, when an edge 14 of steel sheet 5 actuates sensing device 10 by breaking the photoelectric beam thereof, sensing device 10 provides a signal pulse to decimal counter units $19_1$ and $19_2$ through lead 53 to tally 120.00, and also provides a signal pulse to switching circuit 48 through lead 54, "or" circuit 55, and lead 56. Lead 56 is connected to switching circuit 48 so that the output signal is delayed by a few microseconds (see FIG. 3) to provide for the situation where the desired length and the distance where adjustment of the tally occurs happen to coincide. The switching circuit 48 in turn provides an electrical signal to "and" circuit 21 through lead 49 delayed by a few microseconds and thereby allows the feed of electrical pulses from pulse means 2 to the counting means 7. Hence, decimal counter units $19_1$, $19_2$, $19_3$, $19_4$ and $19_5$ again commence tallying electrical pulses from the pulse means 2 at 120.00.

To make the correction when an electrical signal is received from sensing device 11 (positioned 20 feet from reference point 9), lead 57 is connected to storage unit $18_2$ so that an electrical signal is provided to "and" circuit 58 when one of the digits "4" through "9" is selected in programming. Lead 59 is connected to lead 40. By this arrangement, "and" circuit 58 will provide an electrical signal to "or" circuit 60 through lead 61 when a length greater than 340.00 inches (20 feet) and less than 300.00 inches is programmed for measurement. Lead 62 is connected to storage unit $18_1$ so that an electrical signal is provided to "or" circuit 60 when one of the digits "3" through "9" thereof is selected in programming. An electrical signal is, thus, provided to "or" circuit 60 through lead 62 when a length greater than 300.00 inches is programmed for measurement. "Or" circuit 60 will, in turn, provide an electrical signal to "and" circuit 63 through lead 64 when a length greater than 240.00 inches (20 feet) is programmed for measurement. Lead 65 is connected to coincidence circuit 23 so that an electrical signal is provided to "and" circuit 63 when a tally 239.50 is registered by decimal counter units $19_1$, $19_2$, $19_3$, $19_4$ and $19_5$. Sensing device 10 provides an electrical signal to "and" circuit 63 through lead 66 when the sensing device 10 is actuated. By this arrangement, "and" circuit 63 provides an electrical signal to sensing device 11 through lead 67 only when a length greater than 240.00 inches is programmed for measurement, after sensing device 10 has been actuated, and the tally from pulse means 2 is within 0.50 of counting 240.00. At the same time, "and" circuit 63 provides an electrical signal to switching circuit 48 through lead 68, "or" circuit 46, and lead 47, so that the electrical signal to "and" circuit 21 will be stopped and in turn the feed of electrical pulses from pulse means 2 to the counting means 7 will be stopped; "and" circuit 63 also provides an electrical signal to reset circuit 17 through lead 67a, stretching circuit 51 and lead 52, so that the tally is cleared from the decimal counter units $19_1$, $19_2$, $19_3$, $19_4$ and $19_5$ after the feed of electrical pulses from the pulse means 2 is stopped and prior to actuating of the sensing device 11 by an edge 14 of moving steel sheet 5. Lead 69 is connected to decimal counter units $19_1$ and $19_2$ such that, when sensing device 11 is actuated, digits "2" and "4" are registered by decimal counter units $19_1$ and $19_2$ respectively. Hence, when an edge 14 of steel sheet 5 actuates sensing device 11 by interrupting the photoelectric beam thereof, sensing device 11 provides a signal pulse to decimal counter units $19_1$ and $19_2$ through lead 69 to tally 240.00, and also provides a signal pulse to switching circuit 48 through lead 70, "or" circuit 55 and lead 56. Switching circuit 48, in turn, provides an electrical signal to "and" circuit 21 through lead 49 delayed by a few microseconds and thereby allows electrical pulses from pulse means 2 to the counting means 7. Hence, decimal counter units $19_1$, $19_2$, $19_3$, $19_4$ and $19_5$ again commence tallying electrical pulses from pulse means 2 at 240.00.

To make the correction when an electrical signal is received from sensing device 12 (positioned 30 feet from reference point 9), lead 71 is connected to storage unit $18_2$ so that an electrical signal is provided to "and" circuit 72 when one of the digits "6" through "9" is selected in programming. Lead 73 is connected to lead 62. By this arrangement, "and" circuit 72 will provide an electrical signal to "or" circuit 74 through lead 75 when a length greater than 360.00 (30 feet) and less than 400.00 inches is programmed for measurement. Lead 76 is connected to storage unit $18_1$ so that an electrical signal is provided to "or" circuit 74 when one of the digits "4" through "9" thereof is selected in programming. An electrical signal is, thus, provided to "or" circuit 74 through lead 76 when a length greater than 400.00 inches is programmed for measurement. "Or" circuit 74 will, in turn, provide an electrical signal to "and" circuit 77 through lead 78 when a length greater than 360.00 inches (30 feet) is programmed for measurement. Lead 79 is connected to coincidence circuit 23 so that an electrical signal is provided to "and" circuit 77 when a tally of 359.50 is registered by decimal counter units $19_1$, $19_2$, $19_3$, $19_4$ and $19_5$. Sensing device 11 provides an electrical signal to "and" circuit 77 through lead 80 when the sensing device 11 is actuated. By this arrangement, "and" circuit 77 provides an electrical signal to sensing device 12 through lead 81 only when a length greater than 360.00 inches is programmed for measurement, and after sensing device 11 has been actuated, and the tally from pulse means 2 is within 0.50 of counting 360.00. At the same time, "and" circuit 77 provides an electrical signal to switching circuit 48 through lead 82 so that the feed of electrical pulses from pulse means 2 to the counting means 7 will be stopped; "and" circuit 77 also provides an electrical signal to reset circuit 17 through lead 83, stretching circuit 51 and lead 52, so that the tally is cleared from the decimal counter units $19_1$, $19_2$, $19_3$, $19_4$ and $19_5$ after the feed of electrical pulses from the pulse means 2 is stopped, and prior to actuation of the sensing device 12 by an edge 14 of the moving sheet 5. Lead 84 is connected to decimal counter units $19_1$ and $19_2$ such that, when sensing device 12 is actuated, digits "3" and "6" are registered by decimal counter units $19_1$ and $19_2$ respectively. Hence, when an edge 14 of steel sheet 5 actuates sensing device 12 by interrupting the photoelectric beam thereof, sensing device 12 provides an electrical signal to decimal counter units $19_1$ and $19_2$ through 84 to tally 360.00, and also provides a signal pulse to switching circuit 48 through lead 85, "or" circuit 55 and lead 56. Switching circuit 48 in turn provides an electrical signal to "and" circuit 21 through 49 delayed by a few microseconds and thereby allows the feed of electrical pulses from pulse means 2 to the counting means 7. Hence decimal counters $19_1$, $19_2$, $19_3$, $19_4$ and $19_5$ again commence tallying electrical pulses from the pulse means at 360.00.

The circuitry of the correction means 13 where lengths of 480.00 inches or greater are to be measured is essentially repetitive of that hereinabove described. More sensing devices are necessary. The variants are the connec-

---

[4] Stretching circuit 51 is a standard R-C (Resistance-Capacitance) circuit arranged to integrate the input signal.

tions of the leads to storage units $18_1$ and $18_2$, decimal counter units $19_1$ and $19_2$, and coincidence circuit 23, and depend upon the distance of the particular sensing device from the reference point 9.

To stop the correcting means 13 and have the measuring done only by the pulse means 2 and counting means 7, switch 86 is placed in the "off" position.

I prefer that a second counting means be provided to monitor the error of the pulse means 2 in measuring. Such second counting means 90 (see FIG. 3) has lead 87 connected to lead 20 so that "and" circuit 88 receives electrical pulses from pulse means 2 through lead 20 and lead 87. "And" circuit 88 also receives an electrical signal from switching circuit 48 through 89 when an electrical signal is not provided to "and" circuit 21. "And" circuit 88 hence allows the electrical pulses from pulse means 2 to be received by second counting means 90 through lead 91 when switching circuit 48 and "and" circuit 21 stop the feed of electrical pulses from pulse means 2 to counting means 7. Second counting means 90 is comprised of binary decimal counter units $92_1$ and $92_2$, having internal reset circuits, connected in series so that the count decades from one to the next. Each binary decimal counter unit $92_n$ can be a commercially available component such as the "Binary Counter" module (Part No. 58–3503) manufactured by Cutler-Hammer, Inc. (1/2/67). Counting means 90 is provided with an automatic reset circuit 94 which automatically clears counting means 90 through lead 95 a certain time after counting is stopped; reset circuit 94 can be a commercially available component such as the "Duo-Delay Timer" module (Part No. 58–3533) manufactured by Cutler-Hammer, Inc. (1/2/67). Reset circuit 94 receives its actuating signal from switching circuit 48 through lead 49 and lead 93 when an electrical signal is provided to "and" circuit 21 by switching circuit 48. By this arrangement, the error of measuring by pulse means 2 can be continuously monitored and the pulse means 2 can be manually adjusted so that more accurate measurement can be attained.

To illustrate, if counting means 90 recorded 0.37 when the correcting means 13 adjusted the tally as the sheet 5 passed sensing device 10, the operator would know that the pulse means 2 had made an error of minus 0.13 inch, because counting means 90 has commenced when the pulse means 2 tallied 119.50 and has stopped when the sheet 5 actuated the sensing device 10 at 120.00 inches. In an alternative embodiment, counting means 90 can be made to read-out the error directly in plus or minus from the perfect tally of 0.50 so that no calculation is necessary.

In an alternative embodiment (see FIGURE 4) the correcting means 13 does not correct the tally sequentially. Rather it is comprised so that the counting means 7 does not receive electrical pulses from the pulse means 2 until an edge 14 of steel sheet 5 actuates the sensing device furthest from the reference point 9 and still within the length to be measured. The circuitry of correcting means 13 for each sensing device is essentially independent. The circuits are interconnected only to provide convenience and economy in wiring.

To provide for correction when the length to be measured is 120.00 inches or greater, but less than 240.00 inches, lead 96 is connected to storage unit $18_1$ so that an electrical signal is provided to "and" circuit 97 when digit "1" thereof is selected in programming. Lead 98 is connected to storage unit $18_2$ so that an electrical signal is provided to "and" circuit 97 when one of the digits "2" through "9" thereof is selected in programming. By this arrangement, "and" circuit 97 will provide an electrical signal to "or" circuit 98 through lead 99 when a length of 120.00 inches (10 feet) or greater, but less than 200.00 inches is programmed for measurement. Lead 100 is connected to storage unit $18_1$ so that an electrical signal is provided to "and" circuit 101 when digit "2" thereof is selected in programming. Lead 102 is connected to storage unit $18_2$ so that an electrical signal is provided to "and" circuit 101 when one of the digits "0" through "3" thereof is selected in programming. By this arrangement, "and" circuit 101 will provide an electrical signal to "or" circuit 98 through lead 103 when a length of 200.00 inches or greater, but less than 240.00 is programmed for measurement. An electrical signal is hence provided through lead 104 to contact switch 105 when a length of 10 feet or greater, but less than 20 feet is programmed for measurement. Relay 106 is energized by an electrical signal from shearing means 8 through lead 107, when the shearing means 8 is actuated. When relay 106 is energized, the contact switch 105 is closed momentarily to permit an electrical signal through lead 108 to sensing device 10 so that sensing device 10 becomes permissive. When an edge 14 of steel sheet 5 actuates sensing device 10 by breaking the photoelectric beam thereof, sensing device 10 provides an electrical signal to switching circuit 48 through lead 109, "and" circuit 110, lead 111, "or" circuit 112, and lead 113; switching circuit 48 in turn provides an electrical signal to "and" circuit 21 through lead 49 delayed by a few microseconds, thereby allowing the feed of electrical pulses from pulse means 2 through lead 20, "and" circuit 21 and lead 22 to the counting means 7. The actuation of the sensing device 10 also provides the registering of 120.00 in counting means 7 by the connection of lead 114 to decimal counter units $19_1$ and $19_2$ to register "1" and "2" respectively. Decimal counter units $19_1$, $19_2$, $19_3$, $19_4$ and $19_5$ thus commence tallying electrical pulses from the pulse means 2 at 120.00. When the programmed count is reached coincidence circuit 23 provides an electrical signal to switching circuit 48 through lead 25 and lead 115; switching circuit 48 in turn stops providing and electrical signal to "and" circuit 21 through lead 49, thereby stopping the feed of electrical pulses from pulse means 2 through lead 20, "and" circuit 21 and lead 22 to the counting means 7.

To provide for correction when the length to be measured is 240.00 inches or greater, but less than 360.00 inches, lead 116 is connected to lead 100 so that an electrical signal is received by "and" circuit 117 through lead 100 and lead 116 when digit "2" of storage unit $18_1$ is selected in programming. Lead 118 is connected to storage unit $18_2$ so that an electrical signal is provided to "and" circuit 117 when one of the digits "4" through "9" thereof is selected in programming. By this arrangement, "and" circuit 117 will provide an electrical signal to "or" circuit 124 through lead 120 when a length greater than 240.00 inches (20 feet) and less than 300.00 inches is programmed for measurement. Lead 121 is connected to storage unit $18_1$ so that an electrical signal is provided to "and" circuit 122 when digit "3" thereof is selected for programming. Lead 123 is connected to storage unit $18_2$ so that an electrical signal is provided to "and" circuit 122 when one of the digits "0" through "5" is selected in programming. By this arrangement, "and" circuit 122 will provide an electrical signal to "or" circuit 124 through lead 125 when a length of 300.00 inches or greater, but less than 360.00 is programmed for measurement. An electrical signal is hence provided through lead 126 to contact switch 127 when a length of 20 feet or greater, but less than 30 feet is programmed for measurement. Relay 128 is energized by an electrical signal from shearing means 8 through lead 129, when the shearing means 8 is actuated. When relay 128 is energized the contact switch 127 is closed momentarily to permit an electrical signal through lead 130 to sensing device 11 so that sensing device 11 becomes permissive. When an edge 14 of steel sheet 5 actuates sensing device 11 by breaking the photoelectric beam thereof, sensing device 11 provides an electrical signal to switching circuit 48 through lead 131, "and" circuit 132, lead 133, "or" circuit 112 and lead 113; switching circuit 48 in turn provides an electrical signal to "and" circuit 21 through lead 49 delayed by a few microseconds, thereby allowing the feed of electrical pulses from pulse means 2 through lead 20, "and" circuit 21 and lead 22 to the counting means 7. The actuation of the sensing device 11 also provides the registering of 240.00 in counting means 7 by the connection of lead 134 to decimal counter units $19_1$ and $19_2$ to register "2" and "4" respectively. Decimal counter units $19_1$, $19_2$, $19_3$, $19_4$ and $19_5$ thus commencing tallying electrical pulses from the pulse means 2 at 240.00. When the programmed count is reached coincidence circuit 24 provides an electrical signal to switching circuit 48 through lead 25 and lead 115; switching circuit 48 in turn stops providing an electrical signal to "and" circuit 21 through lead 49, thereby stopping the feed of electrical pulses from pulse means 2 through lead 20, "and" circuit 21 and lead 22 to the counting means 7.

To provide for correction when the length to be measured is 360.00 inches or greater, but less than 480.00 inches, lead 135 is connected to lead 121 so that an electrical signal is received by "and" circuit 136 through lead 135 when digit "3" of storage unit $18_1$ is selected in programming. Lead 137 is connected to storage unit $18_2$ so that an electrical signal is provided to "and" circuit 136 when one of the digits "6" through "9" thereof is selected in programming. By this arrangement, "and" circuit 136 will provide an electrical signal to "or" circuit 138 through lead 139 when a length greater than 360.00 inches (30 feet) and less than 400.00 inches is programmed for measurement. Lead 140 is connected to storage unit $18_1$ so than an electrical signal is provided to "and" circuit 141 when digit "4" thereof is selected in programming. Lead 142 is connected to storage unit $18_2$ so that an electrical signal is provided to "and" circuit 141 when one of the digits "0" through "7" thereof is selected in programming. By this arrangement, "and" circuit 141 will provide an electrical signal to "or" circuit 138 through lead 143 when a length of 400.00 inches or greater, but less than 480.00 inches is programmed for measurement. An electrical signal is hence provided through lead 144 to contact switch 145 when a length of 30 feet or greater, but less than 40 feet is programmed for measurement. Relay 146 is energized by an electrical signal from shearing means 8 through lead 147, when shearing means 8 is actuated. When relay 146 is energized the contact switch 145 is closed momentarily to permit an electrical signal through lead 148 to sensing device 12 so that sensing device 12 becomes permissive. When an edge 14 of steel sheet 5 actuates sensing device 12 by breaking the photoelectric beam thereof, sensing device 12 provides an electrical signal to switching circuit 48 through lead 149, "and" circuit 150, lead 151, "or" circuit 112, and lead 113; switching circuit 48 in turn provides an electrical signal to "and" circuit 21 through lead 49 delayed by a few microseconds, thereby allowing the feed of electrical pulses from pulse means 2 through lead 20, "and" circuit 21 and lead 22 to the counting means 7. The actuation of the sensing device 12 also provides the registering of 360.00 in the counting means 7 by the connection of lead 152 to decimal counter units $19_1$ and $19_2$ to register "3" and "6" respectively. Decimal counter units $19_1$, $19_2$, $19_3$, $19_4$ and $19_5$ thus commence tallying electrical pulses from the pulse means 2 at 360.00. When the programmed count is reached, coincidence circuit 23 provides an electrical signal to switching circuit 48 through lead 25 and lead 115; switching circuit 48 in turn stops providing an electrical signal to "and" circuit 21 through lead 49, thereby stopping the feed of electrical pulses from pulse means 2 through lead 20, "and" circuit 21 and lead 22 to the counting means 7.

The circuitry of the connecting means 13 where lengths of 480.00 inches or greater are to be measured is essentially repetitive of that hereinabove described. More sensing devices are necessary. The variants are the connections of the leads to storage units $18_1$ and $18_2$, decimal counter units $19_1$ and $19_2$, and depend upon the distance of the sensing device from the reference point 9.

In operation, when the desired number of sheets of a certain length have been measured, the sheets counter 16 gives a signal to power means 6a through lead 34 to stop the movement of steel sheet 5. It also gives a signal to "not" circuit 153 through lead 154. "Not" circuit 153 [5] in turn, no longer provides an input signal to "and" circuits 110, 132 and 150 through lead 155. Hence, sensing devices 10, 11 and 12 will not actuate switching circuit 48 when the movement of the steel sheet 5 is stopped, thereby permitting the last cut sheet to clear the sensing devices 10, 11 and 12 on the run-off table 156 while the counting means 7 is being reprogrammed. When the movement of the steel sheet 5 is restarted by operating restart switch 15, a signal is provided to "not" circuit 153 through 30' so that "not" circuit 133 in turn provides an input signal to "and" circuits 110, 132 and 150 so that sensing devices 10, 11 and 12 can actuate the switching circuit 48 when one of the beams thereof is broken. If the counting means 7 and the sheets counter 16 have a plurality of banks of storage units, lead 34 can be connected to a delay timer circuit (not shown), such as the "Duo-Delay Timer" circuit (Part No. 58–3533) manufactured by Cutler-Hammer, Inc. (1/2/67). The delay timer circuit is in turn connected to "not" circuit 153, to power means 6a, and to switching circuit 48. Hence, the line can be restarted automatically and continuous operation can be maintained. The delay timer is synchronized with the speed of the run-off table 156 so that the cut sheets have cleared the sensing devices before the measurement of the next desired length is started.

If the desired length to be measured is shorter than the distance between reference point 9 and the sensing device 10, automatic operation cannot be maintained. Switch 158 is placed in the "on" position. Hence, when the restart switch 15 is operated, an electrical signal is provided to switching circuit 48; switching circuit 48 in turn provides an electrical signal to "and" circuit 21, thereby allowing the feed of electrical pulses from pulse means 2 through lead 20, "and" circuit 21 and lead 22 to the counting means 7. This problem can be rendered by placing the first sensing device a relatively short distance from reference point 9.

To stop the correcting means 13 and have the measuring done only by the pulse means 2 and counting means 7 switch 159 is placed on the "off" position and switch 158 is placed in the "on" position.

Figure 2:
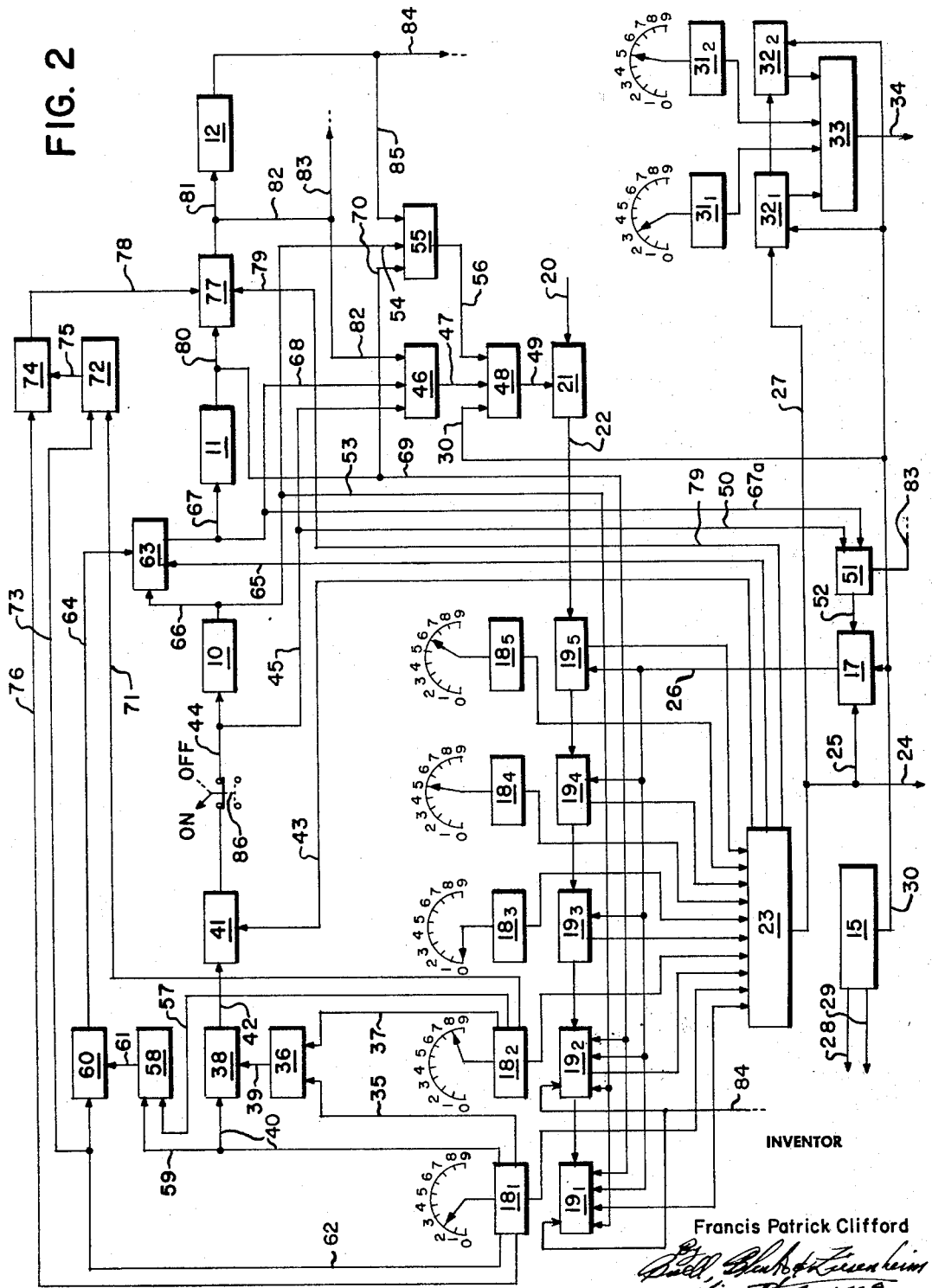
FIGURE 2 is a block diagram of an electrical circuit corresponding to FIGURE 1.

In a further alternative embodiment, the correcting means 13 is comprised of a combination of the circuitry shown in FIGURE 2 and FIGURE 4 and above described. Such alternative embodiments give the apparatus greater flexibility: When a good deal of measuring is to be done of one given length, the counting means and the sensing devices can be used in complement. When the lengths to be measured vary in rapid succession, the sensing devices can be used to adjust the counting means sequentially.

While I have illustrated and described certain present preferred embodiments of my invention, it is to be understood that I do not limit myself thereto, and that my invention may be otherwise variously practiced within the scope of the following claims.

I claim:

1. An apparatus for accurately measuring substantial linear lengths of moving material which comprises pulse means in contact with the moving material and capable of producing electrical pulses at intervals corresponding substantially to a set distance of material travel, counting means capable of tallying electrical pulses produced by the pulse means to a programmed total corresponding to a desired length to be measured, at least one sensing de-

---

[5] A "not" circuit is a circuit which produces an output, when the input is not present. It can be a commercially available component such as Part No. 28–920 manufactured by Cutler-Hammer, Inc. (1/2/67). As used here the "input" is through an independent power source which is switched on by an electrical signal from coincidence circuit 33 and switched off by an electrical signal from restart switch 15.

vice positioned along the direction of movement of the material at a predetermined distance from a reference point and capable of producing an electrical signal when a triggering point on the material passes the predetermined distance, and at least one correcting means capable of receiving an electrical signal from at least one of the sensing devices and adjusting the tally of the counting means to correspond to an essentially perfect measurement of the distance between the reference point and said sensing device.

2. An apparatus for accurately measuring substantial linear lengths of moving material as claimed in claim 1 wherein each sensing device which is a shorter distance from the reference point than the length to be measured actuates a correcting means in sequence to adjust the counting means to correspond to an essentially perfect measurement of the distance between the reference point and said sensing device actuating a correcting means.

3. An apparatus for accurately measuring substantial linear lengths of moving material as claimed in claim 1 wherein the counting means commences to tally the electrical pulses produced by the pulse means when a triggering point on the material passes the sensing device furthest from the reference point and still within the length to be measured, and wherein a correcting means adjusts the counting means to a tally corresponding to a essentially perfect measurement of the distance between the reference point and the sensing device commencing the tally when it receives an electrical signal from said sensing device.

4. An apparatus for accurately measuring substantial linear lengths of moving material as claimed in claim 1 wherein the counting means upon tallying the programmed total actuates at least one die mechanism capable of cutting, stamping and the like to the material at a known point relative to the reference point.

5. An apparatus for accurately measuring substantial linear lengths of moving material as claimed in claim 1 which comprises in addition a second counting means capable of monitoring the adjustment made by at least one of the correcting means.

6. An apparatus for accurately measuring substantial linear lengths of moving material as claimed in claim 2 wherein each correcting means is capable of accepting electrical signals from a sensing device only for a short period of time approximating when the triggering point on the material will be passing it.

7. An apparatus for automatically correcting the accuracy of measuring apparatus for measuring substantial linear lengths of moving material having pulse means in contact with the moving material and capable of producing electrical pulses at intervals corresponding substantially to a set distance of material travel and counting means capable of tallying electrical pulses produced by the pulse means to a programmed total, which comprises at least one sensing device positioned along the direction of movement of the material at a predetermined distance from a reference point and capable of producing a signal when a triggering point on the material passes the predetermined distance, and at least one correcting means capable of receiving the electrical signal from at least one of the sensing devices and adjusting the tally of the counting means to an essentially perfect measurement of the distance between the sensing device and the reference point.

8. An apparatus for automatically correcting the accuracy of measuring apparatus for measuring substantial linear lengths of moving material having pulse means in contact with the moving material and capable of producing electrical pulses at intervals corresponding substantially to a set distance of material travel and counting means capable of tallying electrical pulses by the pulse means to a programmed total as claimed in claim 7 wherein each sensing device which is a shorter distance from the reference point than the length to be measured actuates a correcting means in sequence to adjust the counting means to correspond to an essentially perfect measurement of the distance between the reference point and said sensing device actuating the correcting means, and wherein each correcting means is capable of accepting electrical signals from a sensing device only for a period of time approximating when the triggering point on the material will be passing it.

9. A method of accurately measuring substantial linear lengths of moving material which comprises the steps of generating electrical pulses at intervals corresponding substantially to a set distance of material travel, counting said electrical pulses in a counting means, and automatically correcting the counting at at least one predetermined distance to a tally corresponding to an essentially perfect measurement of said distance from a reference point.

10. A method of accurately measuring substantial linear lengths of moving material as claimed in claim 9 wherein the correcting of the measurement is done periodically and sequentially during the generating and counting steps.

References Cited

UNITED STATES PATENTS

| | | | |
|---|---|---|---|
| 2,110,716 | 3/1938 | Rhea | 83—363 X |
| 2,211,362 | 8/1940 | Bennett | 83—364 X |
| 2,618,046 | 11/1952 | Mansell | 83—76 X |
| 2,655,994 | 10/1953 | Vandenberg | 83—363 X |
| 2,866,428 | 12/1958 | Stanfield et al. | 113—1 |
| 3,082,368 | 3/1963 | Rowe | 318—467 |
| 3,105,405 | 10/1963 | Bessonny | 83—75 |
| 3,157,952 | 11/1964 | Laycak et al. | 33—141 |
| 3,178,974 | 4/1965 | Roess | 83—76 |
| 3,189,812 | 6/1965 | Davis | 318—445 |
| 3,215,015 | 11/1965 | Neely | 83—363 |

FOREIGN PATENTS 814,266    6/1959    Great Britain.

ANDREW R. JUHASZ, *Primary Examiner.*

UNITED STATES PATENT OFFICE
CERTIFICATE OF CORRECTION

Patent No. 3,406,601                                                          October 22, 1968

Francis Patrick Clifford

It is certified that error appears in the above identified patent and that said Letters Patent are hereby corrected as shown below:

Column 2, line 38, "tolerences" should read -- tolerances --; line 44, "ench" should read -- each --. Column 3, line 25, after "compensation" insert a semicolon; line 70, "9" should read -- 8 --. Column 4, line 69, "(1-67)" should read -- (1-64) --. Column 5, line 12, "26" should read -- 20 --; line 42, "(1/2/66)" should read -- (12-66) --; line 43, "(1-67)" should read -- (1-64) --. Column 6, footnote 3, line 5 thereof, "4/1/6)" should read -- 4/1/62) --. Column 7, line 40, "340.00' should read -- 240.00 --; line 51, after "tally" insert -- of -- Column 10, line 34, "and", first occurrence, should read -- an --. Column 11, line 7, "commencing" should read -- commence --; line 9, "24" should read -- 23 --; line 28, "than" should read -- that --. Column 12, line 44, after "7" insert a comma. Column 13, line 25, "a" should read -- an --.

Signed and sealed this 10th day of March 1970.

(SEAL)
Attest:

EDWARD M. FLETCHER, JR.                              WILLIAM E. SCHUYLER, JR.
Attesting Officer                                              Commissioner of Patents